Nov. 27, 1951      A. D. GERACI      2,576,294
AIRPLANE SUSTENTATION AND CONTROL SURFACE ARRANGEMENT
Filed June 26, 1948      2 SHEETS—SHEET 1
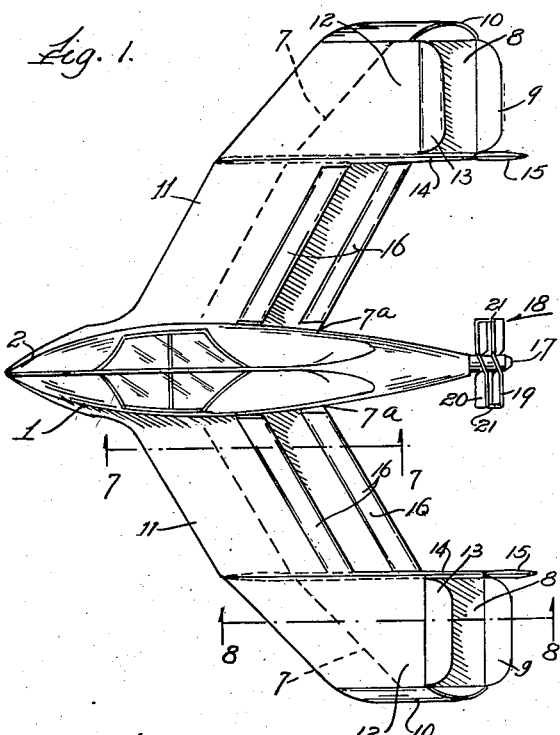
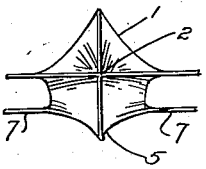
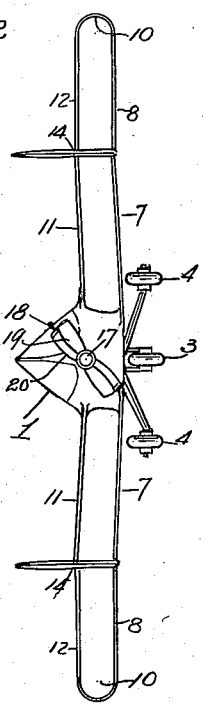
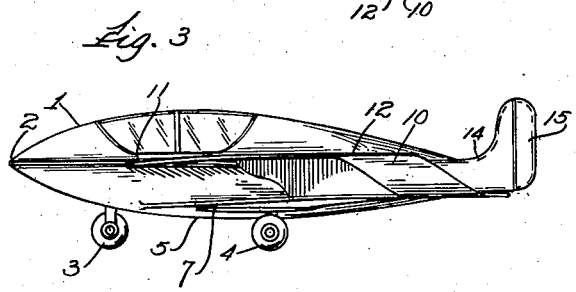
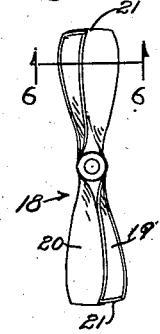
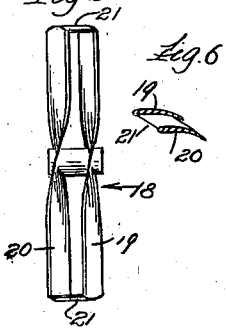
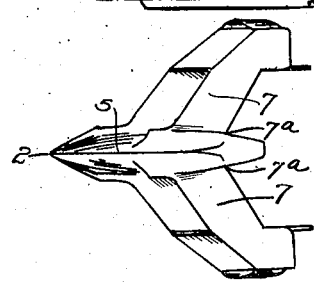
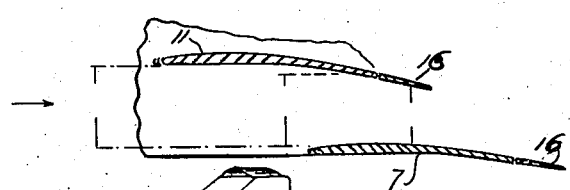
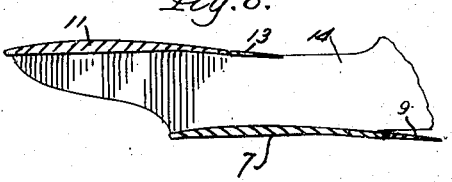
Inventor.
Alexander D. Geraci,
by H. J. Sanders
Attorney.

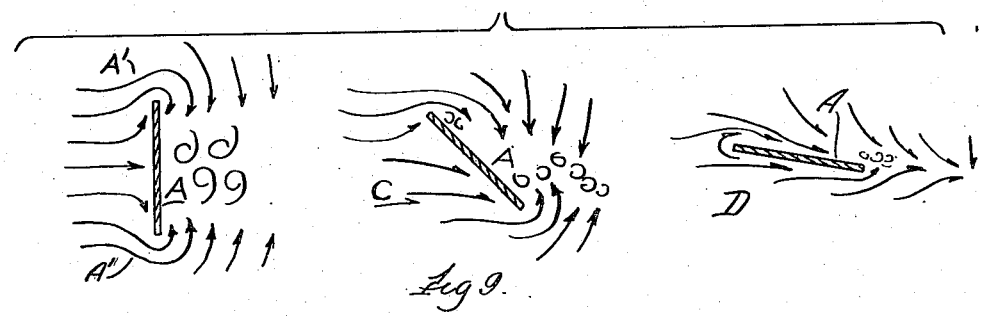
Fig. 9.
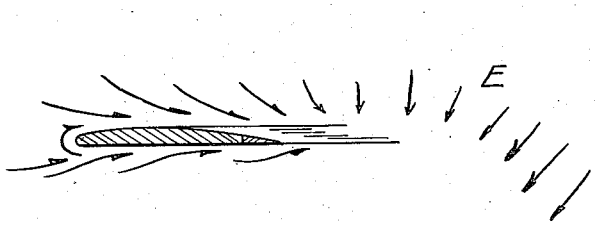
Fig. 10.
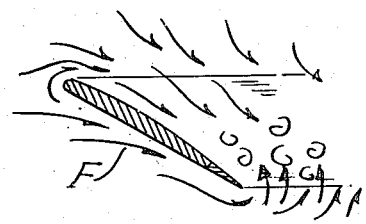
Fig. 11.
Fig. 13.
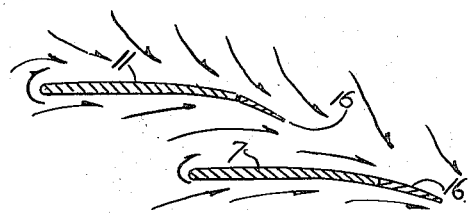
Fig. 12.
Fig. 14.
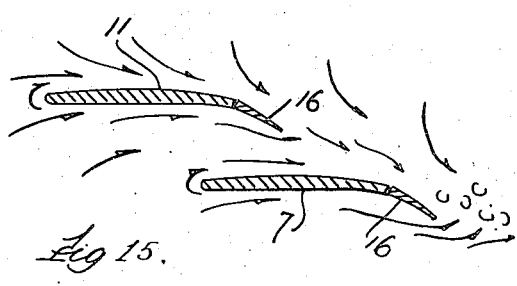
Fig. 15.
Inventor
Alexander D. Geraci.
by H. J. Sanders
Attorney.

Patented Nov. 27, 1951

2,576,294

UNITED STATES PATENT OFFICE 2,576,294

AIRPLANE SUSTENTATION AND CONTROL SURFACE ARRANGEMENT

Alexander D. Geraci, Chicago, Ill.

Application June 26, 1948, Serial No. 35,499

1 Claim. (Cl. 244—13)

This invention relates to aircraft and more particularly to airplanes. Among the objects of the invention is the provision of an airplane of relatively small size possessed of lifting power greatly out of proportion to its size, this due principally to the fact that both aerodynamic and parasitic drag are reduced to the minimum thus providing a vehicle much more stable in operation than any within my knowledge. Another object achieved from the small plane size is lightness in weight, economy in manufacturing cost, ease of control, and the elimination of folding landing gear.

A further object is to provide an airplane of overall streamline contour and one having a higher top speed with lower landing speed, and affording positive action of all controls during landing periods and stalls, the stalling angle being increased to approximately 32 degrees.

More specifically the invention provides an airplane of approximate box-like construction thus reducing the wing cost, greatly increasing overall and tensile strength and providing accessibility so desirable for wing inspection. While the present construction provides a double wing in right and left sets with wings upon each side of the fuselage and blending thereinto, the wings of a side are offset with one wing slightly in advance of the other and but little space between the wings of a side or set. The invention is for all purposes an airplane of the "Flying wings" type due to its construction, stability, control and resultant safety. The instant type is also especially suitable for supersonic planes, the upper flaps being used as variable lift means which can operate to increase the lift for take-offs and landing.

These flaps may be adjusted in flight to give the desired lift in proportion to speed, thus eliminating excess drag at high speeds. The instant propeller is a double offset blade type, the propeller blade being shorter materially than the conventional types thereby permitting materially shortened landing gear of less span and lesser height than heretofore thought possible. In conventional planes it is well known that icing forms on the leading edge of the wing. The presence of ice on the leading edge of a wing interrupts the smooth air flow over the wing and destroys the lift. Reduced burble of air about the leading edge of the lower wing is due to the presence of the upper wing and the thinness of the wings, and because of the lesser space between the wings.

As an airfoil moves in flight it displaces air in proportion to its overall area and angle of attack. When an airfoil at zero angle of attack moves a given distance at flying altitude there is a tendency to create a vacuum in its wake.

In the instant airplane the fuselage is designed to give the maximum lift with minimum drag and, further, the fuselage is so constructed that in effect it becomes part of the wings and also contributes to the lifting force. The top of the fuselage including the canopy is angular, blending into the upper wing section and therefore acting as part of the wing. The wings extend to the nose of the fuselage in order to streamline the juncture of wing and fuselage to a high degree and to impart greater stability to the airplane. The fuselage is angular and all lines meet in a point at the nose enabling it to cut through the air in a definite and positive manner, dividing or splitting the air and causing it to flow around and in and between the various parts of the airplane with minimum disturbance and drag and since the fuselage is, in effect, a part of the wing it is not amiss to call the craft a Flying wings type.

The invention comprises the novel structure hereinafter described and particularly pointed out in the appended claim.

In the drawings:

Fig. 1 is a top plan view of the instant airplane.

Fig. 2 is a view of Fig. 1 in rear elevation.

Fig. 2A is a fragmentary view in front elevation showing the nose of the airplane.

Fig. 3 is a side view of the airplane.

Fig. 4 is a face view of the propeller.

Fig. 5 is a side view of Fig. 4.

Fig. 6 is a horizontal cross sectional view through the propeller adjacent one end thereof, taken on the line 6—6 of Fig. 4.

Figs. 7 and 8 are fragmentary sectional views through the sections of a wing taken upon opposite sides of the divisional strut upon the lines 7—7 and 8—8 respectively; Fig. 7 showing the wing sections at an angle of attack and Fig. 8 showing them at zero angle of attack.

Fig. 9A is a bottom plan view of the airplane.

Fig. 9 presents diagrammatic views showing three positions of a flat piece of material assumed to be travelling through the air and indicating by arrows the air flow thereabout in the several positions.

Fig. 10 is a sectional view of a conventional airplane wing at zero angle of attack and with the flap not in use, the arrows denoting the air flow about and in the wake of the wing.

Fig. 11 is a view similar to Fig. 10 but with the wing disposed at a stalling angle.

Fig. 12 is a view of a conventional wing similar to Fig. 10 but with the flap disposed at an angle, and Figs. 13, 14 and 15 are detached sectional views of the instant wing illustrating the use of the wing flaps and showing by arrows the air flow thereabout as caused by the flap adjustments, comparison being also made to the single conventional wing of Figs. 10, 11 and 12.

The instant airplane includes a fuselage 1 of general overall streamline contour having the pointed nose 2, fore and aft landing wheels 3, 4, substantially fish-shaped under side 5, the side 5 extending from the nose to the rear terminus. While a fuselage is shown and described same may be omitted and continuous right and left sectional wings strut connected and propeller driven provided.

Extending flange-like from the nose a short distance and there beyond laterally and rearwardly from the side 5 at approximately a 30 degree angle thereto upon each side of the fuselage are the lower wing sections 7 each having a somewhat lower face with but slight curvature. The rear edge of each wing section beginning at the point 7a of face 5 has a depth slightly more than one-half the extent of the fuselage from that point to the nose 2, the outer wing section terminations 8 being disposed at an angle to the wing section proper and parallel to each other and to the fuselage and wing portion 8 disposed normally at a zero angle of attack and provided with an elevator 9 conventionally controlled. The remote lateral edges of the wing portions 8 from the elevators forwardly to the leading edge of the section are connected by the upwardly and forwardly disposed concavo-convex ribs 10 to the upper wing sections 11 that are shaped complementary to, disposed a short distance above, parallel to and in part disposed forwardly of the said lower wing section 7 so that the leading and trailing edges of the wing section 11 are in advance of the corresponding edges of the wing section 7 so that the wing sections are offset with respect to each other in the direction of the line of flight, said wing section 11 meeting and merging into the fuselage, the sections 11 including portions 12 parallel to each other and to the fuselage and provided terminally with ailerons 13 conventionally controlled. Also disposed parallel to each other and to the fuselage are the struts 14 that carry the rudders 15 and connect the wing sections 7, 11 and extend from the leading edge of the wing section 11 to the rear edge of the portion 8 of wing section 7, said struts together with the ribs 10 defining lesser or remote air passageways between the wing sections, and taken together with the fuselage defining greater or adjacent air passageways between the wing sections. Each wing section between a strut 14 and the fuselage is provided with a flap 16 conventionally operated, the contours of the leading edges of both wing sections intimate with the greater or adjacent air passageways being disposed at an angle to the corresponding edges of the lesser or remote air passageways, the leading edges of the remote air passageways during normal airplane flight being disposed at zero angle of attack.

Mounted to the drive shaft 17 of the engine is the propeller 18 provided with two blades 19, 20 connected at their ends by the web 21, the blades being disposed one in advance of the other upon the shaft and twisted slightly so that they are somewhat out of line or offset slightly with respect to each other and when viewed in front elevation appear to overlap laterally.

For purpose of comparison and explanation Fig. 9 shows a vertical piece A as being drawn through the air rapidly; air flows equally about the piece, top and bottom, as denoted by arrows A' and causes a burble in the wake of the piece. When piece A is at an angle, as shown at C the air flows more around the top of the piece than about the bottom, causing the burble near the bottom of the piece. At D, the piece is almost horizontal and again the air flows almost equally about the top and bottom and here the burble is materially lessened.

Fig. 10 shows a true conventional wing, the flap not in use. It is here horizontally disposed and the air flow is greater across the top than across the bottom of the wing.

Fig. 11 shows a conventional wing at a stalling angle. Here the lift is destroyed because the great amount of air from the bottom of the wing flows upward about the trailing edge and along the upper edge and collides with air travelling rearwardly over the upper wing surface as denoted by arrows at F.

Fig. 12 shows an ordinary wing and denotes the effect of the flap and the great amount of burble created by the flap angle which while it provides an added degree of lift it creates a very material drag. This flap angle also pitches the leading edge downwardly.

Fig. 13 illustrates the instant double wing with the direction and course of the air stream shown thereabout by arrows, comparison being made to the corresponding conventional wing shown in Fig. 11.

Figs. 14 and 15 show the instant wing illustrating the use of the wing flaps and the resultant air streams, comparison being made to the single conventional wing of Fig. 12. In Fig. 14 the flap 16 of wing section 11 when lowered does not pitch the leading edge forward because it is placed in advance of the center of gravity of the airplane. There is no burble here as the lower wing section draws a substantial amount of air from between the wing sections and over the top of the top wing section. In Fig. 15 both flaps are pitched downwardly and here will be found a slight down pitch of the leading wing edges due to the downward pitch of the lower wing section flap and some burble will result but the lift will be much greater in proportion to the drag.

The concavo-convex ribs 10 actually are extensions of the outer wing sections and contribute to the lift as well as being structural braces for the outer wing sections and they also reduce the wing tip vortices to a minimum. This wing is not to be confused with a biplane as in a biplane the interference between the wings is caused principally by the action of the lower wing which when moving forward draws air downward from the bottom of the upper wing thereby decreasing the pressure below the upper wing. This results in a decrease in the lift of the upper wing. This does not occur in the instant wing as the latter is better described as a sectional wing in which the gap is only approximately 25% of the chord and employs a great stagger as shown in Figs. 7 and 8.

What is claimed is:

An airplane wing composed of upper and lower wing sections, the lower wing section having a lower face of slight curvature, a terminal portion for said lower wing section disposed at an angle to the wing section proper, an elevator for said terminal portion, an upwardly and forwardly inclined concavo-convex rib connecting said terminal portion to said upper wing section, said wing sections being of thin structure and great stagger, an aileron for said upper wing section, struts connecting said wing sections, a rudder carried by said struts, and a flap carried by said upper wing section.

ALEXANDER D. GERACI.

REFERENCES CITED

The following references are of record in the file of this patent:

UNITED STATES PATENTS

| Number | Name | Date |
|---|---|---|
| 1,939,682 | Fleming | Dec. 19, 1933 |
| 2,081,437 | Martin | May 25, 1937 |
| 2,136,403 | Vance et al. | Nov. 15, 1938 |
| 2,194,596 | Henter | Mar. 26, 1940 |
| 2,210,642 | Thompson | Aug. 6, 1940 |
| 2,241,521 | Richard | May 13, 1941 |
| 2,461,805 | Barker | Feb. 15, 1949 |

FOREIGN PATENTS

| Number | Country | Date |
|---|---|---|
| 471,946 | Great Britain | Sept. 14, 1937 |
| 812,900 | France | Feb. 15, 1937 |

OTHER REFERENCES

Warner: "Airplane Design," McGraw-Hill Book Co., 1st edition; pp. 28–31, pp. 109–114 and pp. 146–151.

Warner: "Airplane Design," 2nd edition; pp. 297–309 and pp. 70–76.

Millikan: "Aerodynamics of the Airplane," pp. 58–65.